US005343603A

United States Patent [19]

Pioch

[11] Patent Number: 5,343,603

[45] Date of Patent: Sep. 6, 1994

[54] MACHINE FOR MACHINING PARTS FROM LONG PROFILES OR BARS

[75] Inventor: Michel Pioch, Saint-Cere, France

[73] Assignee: Cepede, A French Societe Anonyme of Zone Industrielle De Saint-Laurent, Saint Cere, France

[21] Appl. No.: 988,304

[22] Filed: Dec. 8, 1992

[51] Int. Cl.[5] ........................ B23D 23/02; B23B 13/04

[52] U.S. Cl. ........................................ 29/27 C; 82/127

[58] Field of Search .................. 29/27 A, 27 R, 27 C, 29/27 B, 36; 82/127, 124, 164, 162

[56] References Cited

U.S. PATENT DOCUMENTS

| | | | |
|---|---|---|---|
| 3,101,019 | 8/1963 | Lelan | 82/127 |
| 3,636,802 | 1/1972 | Hessinger | 82/127 X |
| 4,087,890 | 5/1978 | Ishizuka et al. | 29/27 C |
| 4,246,813 | 1/1981 | Grachev et al. | 82/127 |
| 4,296,657 | 10/1981 | Yasuba et al. | 29/36 X |
| 4,321,845 | 3/1982 | Szabo et al. | 82/127 |
| 4,366,734 | 1/1983 | Aeschbacher | 82/127 |
| 4,949,444 | 8/1990 | Kojima et al. | 29/27 R |
| 5,029,499 | 7/1991 | Okitsu | 82/127 X |
| 5,222,421 | 6/1993 | Ushiro | 82/164 |

FOREIGN PATENT DOCUMENTS

| | | | |
|---|---|---|---|
| 41805 | 2/1990 | Japan | 82/127 |

*Primary Examiner*—William Briggs
*Attorney, Agent, or Firm*—Thomas R. Vigil

[57] ABSTRACT

The machine comprises a base (3), a first mandrel (4), a second mandrel (5) and a third mandrel (6) for the holding and positioning of the profile or bar (2), and structure (7, 8) to mount at least the second mandrel (5) and the third mandrel (6) in cooperation with the base (3), so that they can be displaced in translation relative to the base along a same machining axis (9).

10 Claims, 2 Drawing Sheets

MACHINE FOR MACHINING PARTS FROM LONG PROFILES OR BARS

BACKGROUND OF THE INVENTION

1. Field of the Invention

The present invention relates to machines for the machining of parts from very long profiles that may present a certain flexibility, especially to machines meant for the formation of aeronautics parts, starting from extruded aluminum profiles or bars.

2. Description of the related art including information disclosed under 37 CFR §§1.97–1.99

There are already known a few machines for the machining of parts from very long profiles. Among these machines, there is one that, schematically, comprises a base, two mandrels, means to mount the two mandrels in cooperation with the base so that they are capable of (a) displacement in translation relative to the base following an axis of a machining operation and also of (b) pivoting around that same axis, a machine to govern the mandrels, and machining mechanisms capable of cooperating with the profiles or bars to machine the part of same that is located between the two mandrels.

The machine works in the following manner. First, there is made to slide into the two mandrels, the profile or bar from which must be made parts of a specific shape, in a manner such that one of the ends of the profile or bar is placed in a first mandrel, the longest part of the profile or bar being offset relative to the second mandrel. The portion of the profile or bar that is to be machined then is held between the two mandrels, and is perfectly rigid, the small distance between the two mandrels not making it possible for it to suffer any deformation, by flection for example.

It is then possible to operate the machining mechanisms, suitable to execute the part in the pre-set shape, for example boring, routering, etc. using tools that work between the two mandrels.

When the machining of that part of the profile or bar is completed, the first mandrel is loosened and, without loosening the second mandrel, its displacement is actuated in translation toward the first mandrel, this driving along the profile or bar in the same displacement. When the two mandrels are as close to each other as possible, there is actuated the re-tightening of the first mandrel and the loosening of the second one that is displaced in translation in the direction opposite that of the previous displacement, to get it back at some distance of the first mandrel.

The second mandrel is re-tightened and the machining means again can be actuated according to the pre-set program in order to work on the new portion of the profile that is defined and held between the two mandrels.

The above-described operations are repeated as many times as necessary to execute, in the profile or bar, the part of pre-set shape, until the second end of the profile or bar reaches the level of the second mandrel, if needed.

There is thus seen that the above-described machine does not permit to optimize the machining of profiles because it is obvious that the successive displacements of the mandrels, as well as their loosening and re-tightening to release then block the profile or bar, lead to unavoidable positioning errors that add up at the time of each translation of the second mandrel relative to the base. The precision of these machines therefore is average because of these cumulated, and not, necessarily, repetitive errors in the machining of long parts.

The above-described successive operations, further, do not make it possible to act on the profiles or bars and on the machined parts while the same still are on the machine tool, for example for other operations of control, of marking or of forming (rim-holing).

SUMMARY OF THE INVENTION

The present invention thus has as its purpose to obviate the above-mentioned drawbacks and to provide a machine for the machining of parts from very long profiles and a machine that permits the performance of a high precision machining to obtain parts o perfect quality, most of them completely finished, as they come out of the machine, and even to integrate complementary operations of marking or forming.

More specifically, the present invention has as its object a machine for the machining of a part from a very long profile or bar that comprises:

a base, a first and a second a third mandrels for the holding and positioning of the profile or bar, and structure to mount at least the second and third mandrels in cooperation with the base in a manner such that they can move in translation relative to the base along a second machining axis.

Other characteristics and advantages of the present invention will appear in the course of the following description that is given with respect to the accompanying drawing.

BRIEF DESCRIPTION OF THE DRAWINGS

FIG. 1 is a side view of the machine.

FIG. 2 is a top view of the machine.

DESCRIPTION OF THE PREFERRED EMBODIMENT(S)

Figure 1:
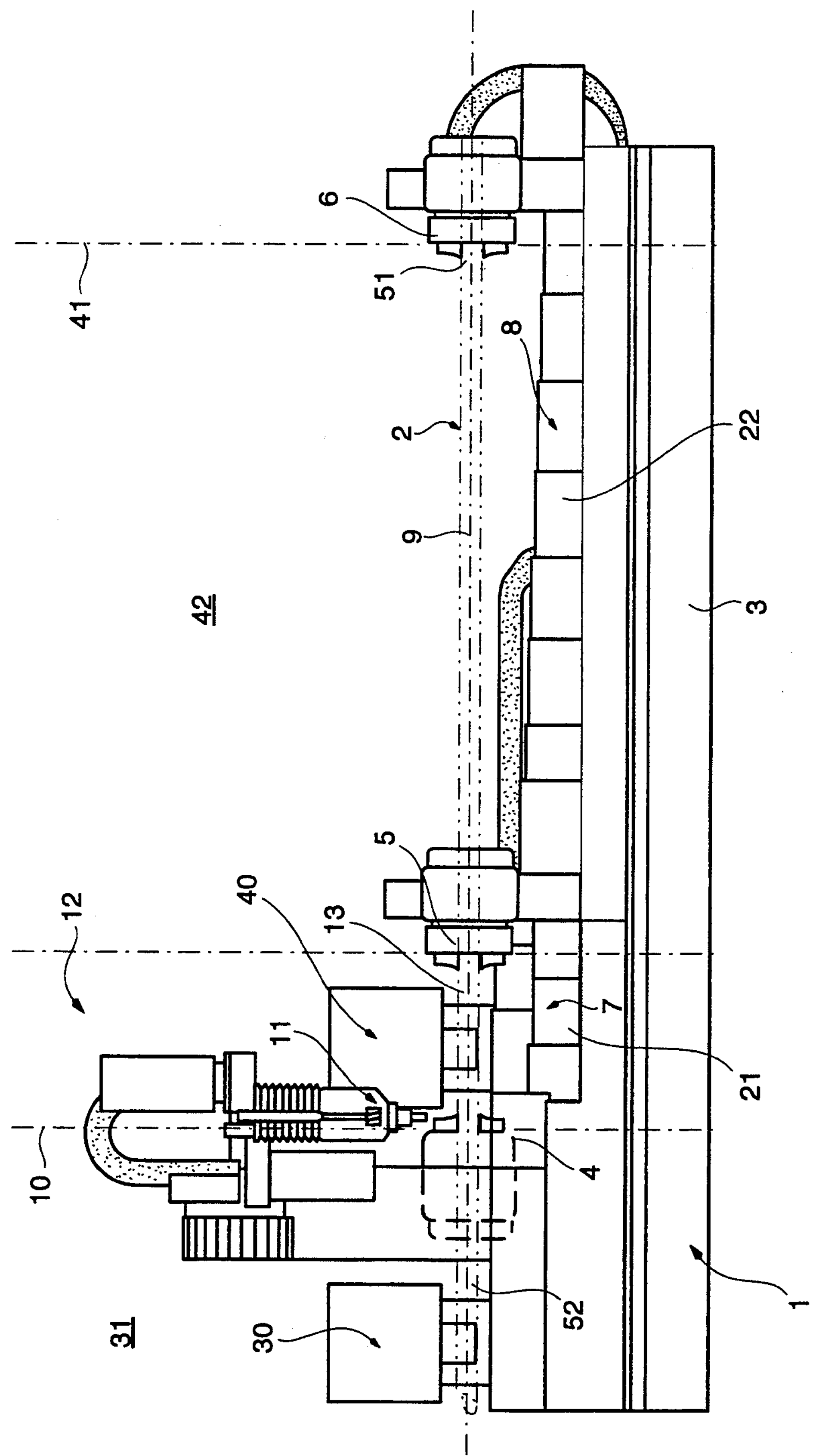
FIGS. 1 and 2 show a mode of execution of a machining machine according to the present invention.
Figure 2:
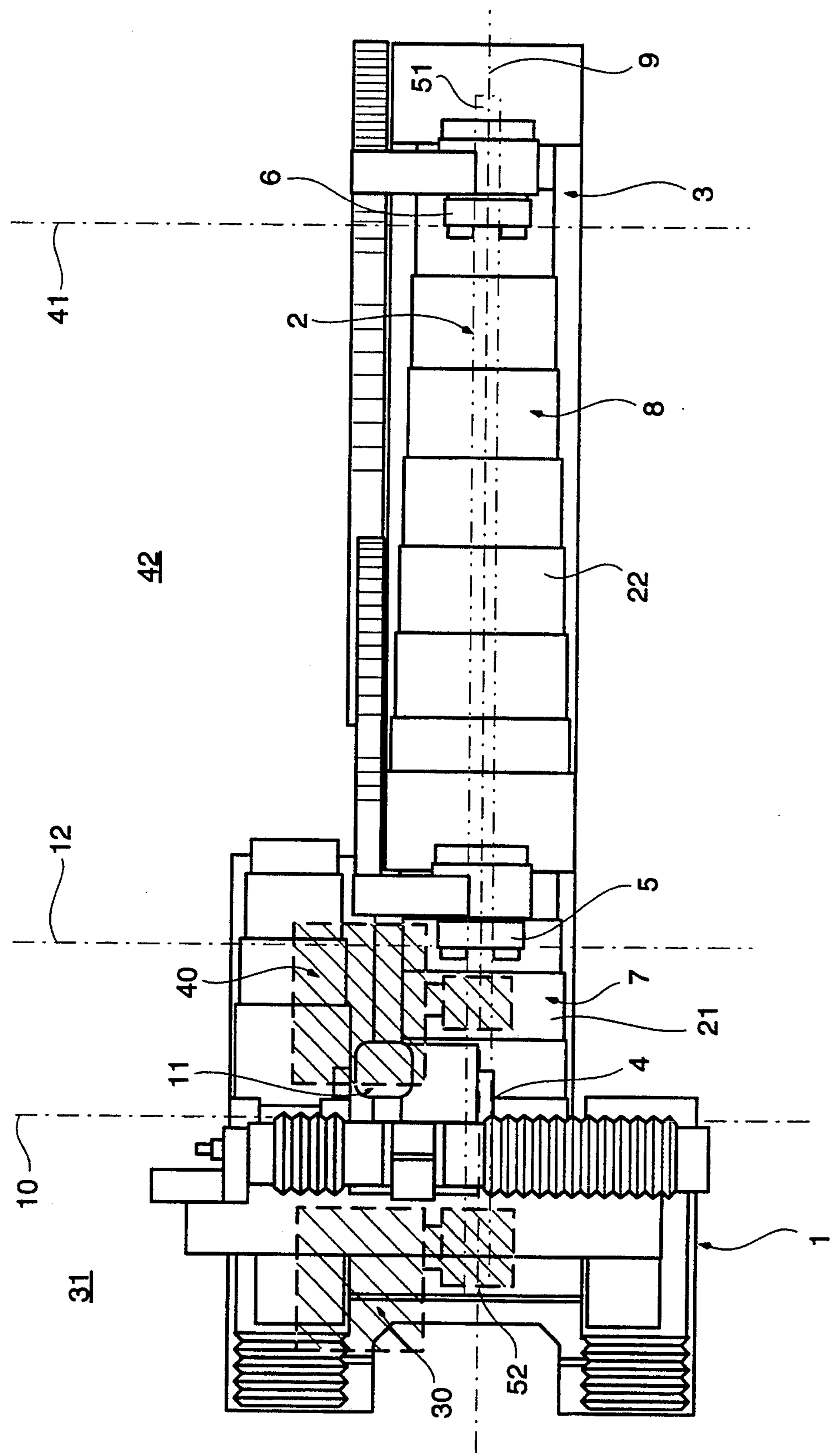

FIGS. 1 and 2 show a machine 1 for the machining of a part out of a very long profile or bar 2.

By profile or bar 2 there is understood any oblong metal piece capable of being machined, having, for example, the shape of a bar or the like.

The machine 1 mainly comprises a base 3 suitable to be rigidly positioned on the ground, a plate or slab in a plant for example. It further has a first mandrel 4, a second mandrel 5 and a third mandrel 6 for the holding and positioning of the profile 2, and structure 7 and 8 to mount at least the second mandrel 5 and the third mandrel 6 in cooperation with the base 3 in a manner such that both can be displaced in translation relative to the base 3 along an axis 9 coaxial with the machining axis a of the machine; Generally, the first mandrel 4 is mounted in cooperation with the base 3 in a manner such that it remains fixed in a plane 10 perpendicular to the machining axis 9.

By mandrel 4, 5 or 6 there is understood any device that comprises one or several clamping jaws capable of being displaced radially or concentrically for example, to come and place itself, by all displacement means, on the periphery of the profile or bar 2 to hold same firmly on a given axis. These clamping jaws and means generally are placed inside a sleeve that makes their positioning possible, relative to the base 3 for example. Such mandrels 4, 5 and 6 for machining machines are well known in themselves, sometime being referred to as a chuck, and they shall not be more lengthily described in the present description.

Machining devices 11 are placed in the space 12 located between the first mandrel 4 and the second mandrel 5, to cooperate with the part 13 of the profile or bar 2 found between these two mandrels 4 and 5.

Besides the fact that the mandrels 4, 5 and 6, especially the second and the third ones 5 and 6, may be imparted a translation motion along the machining axis 9, it proves advantageous for the three mandrels 4, 5 and 6 to be imparted a motion of rotation around that axis 9. Indeed, in order to facilitate the machining of the profile 2 by the device 11, it must be possible to cause it to rotate around its longitudinal axis, so as to present it as correctly as possible to the machining tools. To that end, it proves advantageous for the machine 1 to be equipped with structure to mount the mandrels 4, 5 and 6 rotating relative to the machining axis 9, and with structure to govern their rotation. Especially, the sleeve of each mandrel 4, 5 and 6 is mounted rotating relative to a base used for the fixation of the mandrel 4, 5 or 6 relative to the base 3.

The assembly of structure for mounting the mandrels 4, 5 and 6 rotating relative to the machining axis 9 and the assembly of structure to move them into rotation are well known in themselves, and they shall not be more lengthily described here, for the sake of simplifying the present description.

On the other hand, in a preferred mode of execution, the structure 7, 8 to mount at least the second mandrel 5 and the third mandrel 6 in cooperation with the base 3 so that they can be displaced in translation relative to that base along a same machining axis 9 comprise roller glides 21, 22, driving systems using screws and screw-nuts driven by controlled electric or hydraulic motors.

The displacement of the third mandrel 6 is dependent on the linear measurement that ensures the precision of the machining operations along the parts and the profile or bar. The positioning of the second mandrel 5 also is dependent on a linear measurement, the positioning precision being only that of the position of the support created by mandrel 5.

According to an advantageous characteristic, the machining machine 1 described above comprises forming mechanisms 30, that is to say means that make it possible to bend, under certain conditions, metallic parts that mainly, but not exclusively, are meant for the field of aeronautics.

The forming mechanisms 30 mostly are constituted by a press that permits the application of pressing force on portion of a part another portion of which is subjected to a counter-reaction force. These mechanisms 30 have been schematically shown in FIGS. 1 and 2.

In an advantageous mode of execution of the machining machine 1, these mechanisms 30 are located at the exit of the first mandrel 4, inside space 31 limited by the plane 10 perpendicular to the machining axis 9, and that approximately cuts through the first mandrel 4 but that does not contain the second mandrel 5 nor the third mandrel 6.

According to another advantageous characteristic, the machining machine 1 comprises a marking mechanism 40. The marking mechanism 40 advantageously are located inside a space 42 limited by the two planes 10 and 41 perpendicular to the machining axis 9 and that approximately cut through the first mandrel 4 and the third mandrel 6.

The above-described machining machine 1 operates in the following manner:

The profile 2 first is positioned in the three mandrels 4, 5 and 6 so as to run through the second mandrel 5, one of its ends, the second one 52, being placed on the first mandrel 4 and its first end 51 being placed in the third mandrel 6, first positioned relative to the base 3, the farthest possible from the first mandrel 4 or at a distance slightly inferior to that of the profile length.

The first and third mandrels 4 and 6 are tightened in order firmly to hold the ends 52, 51 of the profile in the machining axis, then there is actuated the displacement of the second mandrel to bring it at a given distance from the first one 4, and to define the portion of the profile 2 to be machined. The second mandrel 5 in its turn is tightened in order to obtain optimal rigidity of that portion of the profile 2 to be machined, and a governing mechanism actuates the machining mechanisms 11 to execute the machining of the part portion according to the corresponding part of the program and according to a technique well known in itself, possibly by causing pivoting around the machining axis of either the machining mechanisms 11, or the assembly of the three mandrels 4, 5 and 6 when necessary.

It is observed that during this first operation the first end of the profile or bar 2 constantly is well maintained by the third mandrel 6, this making it possible to ensure the rigidity of the profile 2 over its entire length, even when the second mandrel 5 has to be loosened to be displaced.

In order to execute the machining of another part of the profile 2, there are loosened both the first mandrel 4 and the second mandrel 5 together, and there is actuated the translation of the third mandrel 6, without loosening it of course. In that way, the translation of the profile 2 is perfectly determined and the error that may occur results only from structure 8 that ensure the translation of the third mandrel 6, while, in the operation of the machining machines of the prior art, there were multiple causes of error: two mandrel translations and at least three loosenings and retightenings of the mandrels.

With a structure of a machining machine 1 such as the one according to the present invention, it is further possible to section or not the machined profile 2, in its portion located between the first and the second mandrels 4 and 5, since the first end 51 of the profile 2 constantly is firmly held by the third mandrel 6. When the profile 2 is sectioned, it is sufficient, in order to recover the machined part, to loosen the first and second mandrels 4 and 5 and to translate the profile 2 by means of the third mandrel 6 by pushing the part 13 separated from the non-machined portion of the profile 2 through the first mandrel 4 until it comes out of the machine 1.

Such a machine 1 moreover makes possible the forming of part portions. To that end, the two mandrels 4 and 5 are loosened and the profile 2 is translated by means of the third mandrel 6, so as to bring between the two jaws of the forming mechanisms 30, the part portion initially located between the first and the second mandrels 4 and 5, in order to obtain the desired deformation for that part portion. The profile 2 is then moved rearward to bring back the part to be sectioned between the first and the second mandrels 4 and 5, and to section it. The machined part 13, formed and sectioned, is then recovered at the exit of the machine 1 by being pushed, as described above, by displacing the third mandrel 6 toward the first and second ones 4 and 5.

Likewise, it is possible to mark or reference each part 13 machined from the profile 2.

The above-described operations may be repeated as many times as the length of the profile 2 permits, that is to say, in fact, until the first mandrel 4 comes in contact with the second one 5, each part of the profile 2 located between the first and the second mandrels 4 and 5 being, each time, machined according to the program part corresponding to it.

From the above description of the operation of the machining machine 1, it can be seen that the latter offers numerous advantages relative to similar machines of the prior art, especially in that all of the different operations can be actuated with reference to the free, first end of the profile 2 that is constantly firmly held by the third mandrel 6 that is never loosened. The other two mandrels 4 and 5, in fact, are only means to hold the part portion to be machined according to a corresponding part of the program, and it is not imperative for their positioning to be extremely precise.

The totality of the mandrels' 4, 5 and 6 movements in translation and in rotation, and those for the displacement of the tools for piercing, sectioning, routering, forming and marking, are managed by a numerical control, the program for the execution of the part 13, are written by the user for ensuring the unfolding of the displacements in a coordinate manner.

Although only one embodiment of this invention has been shown and described, it is to be understood that modifications and substitutions, as well as rearrangements and combinations of the preceding embodiment can be made by those skilled in the art without departing from the teachings of this invention. Accordingly, the scope of the invention is only to be limited as necessitated by the accompanying claims.

I claim:

1. A machine for successively machining successive portions of a long bar or profile, said machine comprising:

a base, a first mandrel aligned on a machining axis;

a second mandrel aligned on said machining axis;

each of said mandrels being mounted on said base and having clamping means to firmly hold said bar or profile at both ends of a portion of said bar or profile defined by the distance between said first and said second mandrels, at least said second mandrel being movable in translation on said base along a direction parallel to said machining axis between a position where said first mandrel and said second mandrel are close together and a position where said first and said second mandrel are spaced by said distance, machining device means adapted to be located between said first and second mandrels for machining said portion of said bar or profile firmly held by said first and second mandrels, and a third mandrel which is mounted on said base, which is aligned with said machining axis on a side of said second mandrel opposite to a side facing said first mandrel, and which has clamping means for holding said bar or profile at an end thereof, said third mandrel being movable in translation on said base along said direction parallel to said bar or profile, in order to translate it through the distance between said first and second mandrels when the clamping means thereof are loosened.

2. A machine according to claim 1 comprising glide means mounting at least said second and third mandrels in a translatable manner on said base.

3. A machine according to claim 1 comprising means to pivot said mandrels around said machining axis in order to present said portion of said bar or profile in a correct position to said machining device means.

4. A machine according to claim 1 wherein said machining device means comprises marking means.

5. A machine according to claim 1 wherein the displacements in translation of said third mandrel are governed by a device controlled by a precision linear measurement means.

6. A machine according to claim 1 comprising integrated forming means.

7. A machine according to claim 6 wherein said forming means are located at the exit of said first mandrel remote from said second mandrel.

8. A machine according to claim 1 comprising marking means.

9. A machine according to claim 1 wherein said machining device comprises piercing and/or routering means.

10. A machine according to claim 1 comprising sectioning means located between said first and second mandrels.

* * * * *